May 19, 1964   J. A. DICKERSON   3,134,073
NULL DETECTING BRIDGE CIRCUIT FOR TESTING
BACK RESISTANCE OF A DIODE
Filed Dec. 22, 1960

INVENTOR.
JACK A. DICKERSON
BY Ronald J. Kranedorf
AGENT

3,134,073
NULL DETECTING BRIDGE CIRCUIT FOR TESTING BACK RESISTANCE OF A DIODE

Jack A. Dickerson, Rhinebeck, N.Y., assignor to International Business Machines Corporation, New York, N.Y., a corporation of New York
Filed Dec. 22, 1960, Ser. No. 77,549
4 Claims. (Cl. 324—58)

This invention relates to a device for testing non-linear resistance elements to determine the potential which, when impressed across such an element, will cause it to have a particular resistance value.

When selecting a non-linear resistance element, such as a crystal diode, for a particular application, it is often necessary to know what potential may be impressed across the diode in its reverse bias direction without causing its resistance to drop below a certain predetermined value. For instance, if the diode is to be used as a rectifying element, this determination would indicate to the circuit designer how large a back potential could be applied without causing the diode to lose its rectifying properties. Since large quantities of these diodes are presently being used, many thousands of them being used in a single digital computer, it was necessary to devise a circuit which would automatically or semi-automatically measure the above described reverse characteristics of a diode.

It is, therefore, an object of this invention to provide a device for testing non-linear resistance elements to determine the potential that, when applied across such a resistance element will cause the element to have a given predetermined resistance.

In accordance with this object, the invention utilizes a comparison circuit having two branches. A standard resistance element is included in one of the branches and means are provided for connecting the diode or other non-linear resistance element being tested in series with the other branch. A unidirectional regularly increasing potential is impressed across the comparison circuit in such a direction as to back bias the diode. Means are provided for detecting when an equal current condition exists in each of said branches and for generating an output signal in response to this condition for locking the uniformly increasing potential at its existing value. The potential across the branches is then measured and recorded.

The foregoing and other objects, features and advantages of the invention will be apparent from the following more particular description of a preferred embodiment of the invention, as illustrated in the accompanying drawings.

Figure 1:
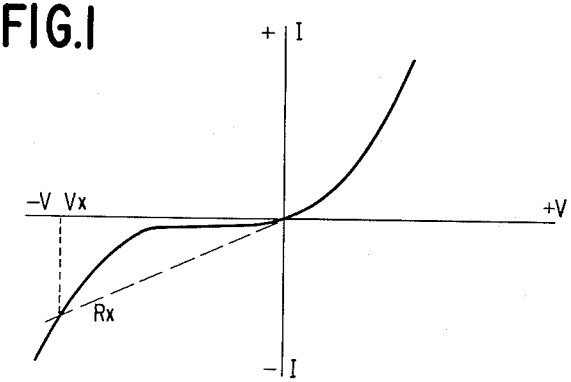
FIG. 1 is a typical characteristic curve for a crystal diode with the characteristic measured by the circuit of this invention marked on it.

Referring to FIG. 1, it is seen that the back resistance of a diode remains fairly constant with increasing back voltage until a particular value is reached and then drops off rather sharply. In designing a diode circuit, a circuit designer might select a resistance value $Rx$ as the minimum back resistance value at which the diode still exhibits acceptable rectifying properties. He would then be interested in knowing what reverse potential, $Vx$, could be impressed across the diode without causing "breakdown" to occur, "breakdown" being defined as the resistance of the diode dropping below $Rx$. This property of a diode, the potential at which breakdown occurs, will hereinafter be referred to as either (1) the "reverse characteristic" of the diode or (2) the "reverse dynamic characteristic" of the diode, the former term being used when the diode is operating under D.-C. or static conditions and the latter when the diode is operating under A.-C. or dynamic conditions.

Figure 2:
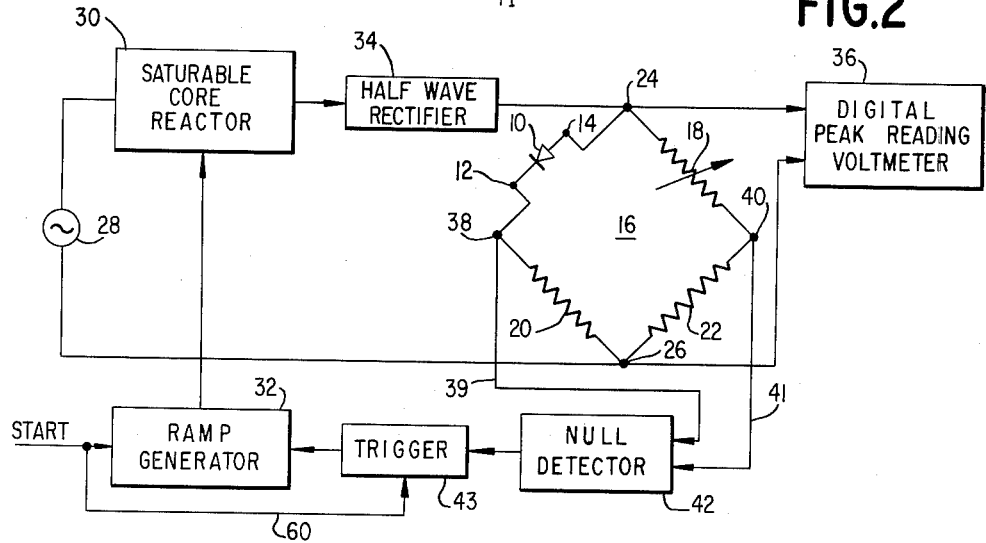
FIG. 2 is a semi-block diagrammatic representation of a circuit embodying this invention.

FIG. 2 shows a preferred embodiment of a semi-automatic reverse dynamic characteristic tester constructed in accordance with the teachings of this invention. The diode under test 10 is connected between terminals 12 and 14 to form one leg of a bridge 16. A variable resistor 18 forms one adjacent leg of the bridge, the remaining two legs of the bridge formed by balanced resistors 20 and 22. An input potential is applied across terminal vertices 24 and 26 of bridge 16. A.-C. source 28 generates a potential which is attenuated in saturable core reactor 30 and rectified in half-wave rectifier 34 before being applied as the input potential to vertex 24. Ramp generator 32 supplies an output signal varying exponentially with time which is applied to the control winding of saturable core reactor 30 to control the impedance which the reactor presents to the A.-C. signal from source 28. A peak reading digital volt meter 36 is also connected across the input vertices 24 and 26. If a peak reading digital voltmeter is not available, an R.M.S. to peak converter may be connected in the circuit between the input vertices and a standard digital voltmeter.

Vertices 38 and 40 of the bridge 16 are connected by lines 39 and 41 to the input terminals of null detector 42. Null detector 42 may be any suitable circuit which is capable of comparing two input signals and giving a detectable output signal when the two inputs are equal. A null detector suitable for use with this invention is shown in Patent 2,715,718, issued to M. C. Holtje on August 16, 1955. A trigger 43 which may, for example, be a thyratron, is connected to be operated by the output from the null detector to apply a signal to coil 44 (FIG. 3) of ramp generator 32. The activation of coil 44 locks the output potential of the ramp generator at its existing level in a manner to be described later.

Figure 3:
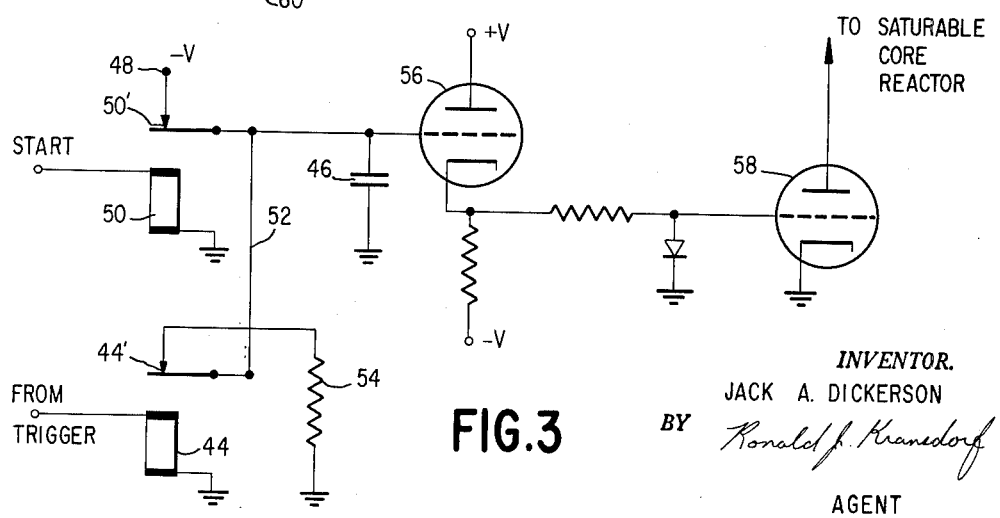
FIG. 3 is a schematic representation of a ramp generator suitable for use with the circuit of FIG. 2.

FIG. 3 shows a ramp generator suitable for use in the circuit of FIG. 2. A capacitor 46 is connected to be normally charged from a source of negative potential 48 through a normally closed contact 50'. In parallel with the capacitor charging circuit is a capacitor discharge circuit comprising line 52, normally closed contact 44' and resistance 54 to ground. Contact 50' is opened by energizing start coil 50 and contact 44' by energizing hold coil 44. Capacitor 46 is also connected in the grid circuit of cathode follower tube 56, the cathode of tube 56 being directly coupled to the grid of tube 58. Both tubes 56 and 58 may be considered to be conducting at all times during the test. The control winding (not shown) of saturable core reactor 30 (FIG. 2) forms the plate load for tube 58.

Referring to FIGS. 2 and 3, a reverse dynamic characteristic test is initiated on a suitably positioned diode 10 by applying a start pulse to start coil 50 and, through line 60, to trigger 43. The duration of this start pulse is slightly longer than the maximum time required for a complete test operation. This opens contact 50' disconnecting capacitor 46 from negative potential source 48 and allowing the capacitor to discharge to ground through the beforementioned discharge circuit. The start pulse also conditions trigger 43 to be operated by a signal from null detector 42. The discharge of capacitor 46 slowly raises the grid potential of cathode follower tube 56. The resulting rise in the cathode potential of tube 56 is directly coupled to the grid of tube 58 to increase the current flowing through this tube and, therefore, through the control winding of saturable core reactor 30. As the current through the control winding of the saturable core reactor slowly increases, the effective resistance which the saturable core reactor presents to the A.-C. signal from source 28 steadily decreases, the output from the saturable core reactor being therefore an A.-C. wave of steadily increasing amplitude. Since it is desired to reverse bias the diode, the circuit of FIG. 2 provides a half-wave rectifier 34 which clips off the upper half of the A.-C. wave. The resulting input signal to the bridge 16 is therefore a series of negative half-sine waves of steadily increasing amplitude.

Since the resistance of the variable resistor 18 has previously been adjusted to $R_x$, bridge 16 is balanced when the potential across diode 10 is sufficient to reduce its resistance to $R_x$. The bridge being balanced results in equal potentials appearing at the vertices 38 and 40 and, therefore, at the two inputs to null detector 42. As mentioned before, the null detector is of a type which gives an output signal when its inputs are equal. This output signal is applied to operate the conditioned trigger 43 (for example, to fire a thyratron). Hold coil 44 of the ramp generator is connected to be energized when trigger 43 is operated, transferring contact 44' to open circuit the capacitor discharge path. This prevents any further discharge of the capacitor 46, effectively locking the output from the ramp generator and therefore the input to the bridge 16 at its existing level. Leakage from the capacitor 46 is maintained at a low level, while readings are being taken, by the high input impedance of the cathode follower 56 and by the use of a high quality, low leakage capacitor.

The peak potential measured by digital voltmeter 36 rises uniformly with the input potential until the desired potential is reached, and then remains fixed at that level due to locking of the input potential. This detectable difference in the indication of the voltmeter tells the operator that a reading should be taken. Other similar means could be provided to cause a detectable difference in the indication of the voltmeter in response to the output signal from null detector 42 or means could be provided to automatically record the final voltmeter readings.

It should be noted that the peak potential across the bridge 16 measured by digital voltmeter 36 differs from the true value of $V_x$ by the potential drop across the resistor 20, but a proper selection of resistors 20 and 22 can reduce this error to a negligible amount. For instance, if the range of $R_x$ is from 500K to 1000K, a resistor 20 of 2K would result in an error of less than one percent in the determination of $V_x$.

When the start pulse terminates at the end of a test cycle, coil 50 is de-energized allowing capacitor 46 to be recharged through the now closed contact 50' and trigger 43 is deactivated de-energizing hold coil 44 to close-circuit the capacitor discharge path. The circuit is thus reset for the next test cycle.

If one is interested in the D.-C. rather than the A.-C. response of a diode the circuit of FIG. 2 could easily be modified to measure the reverse characteristic of a diode by connecting the output of cathode follower 56 directly to the input vertex 24 of the bridge.

The semi-automatic tester described so far could be made fully automatic by having the diodes 10 mounted on a belt driven by a timed stepping mechanism such as a clutch, the periodic stepping of the belt advancing successive diodes into the test position between contacts 12 and 14. The potential applied to digital voltmeter 36 could then be applied instead to a suitable interpreting and recording device such as a card punch to give a permanent record of the reverse characteristic tested.

While the invention has been particularly shown and described with reference to a preferred embodiment thereof, it will be understood by those skilled in the art that the foregoing and other changes in form and detail may be made therein without departing from the spirit and scope of the invention.

I claim:

1. A circuit for determining the reverse potential which will cause the resistance of a non-linear resistance element to fall to a predetermined value comprising in combination a bridge circuit having two branches one of said branches including means for connecting in series therewith a non-linear resistance element to be tested, the other one of said branches including a reference resistance element, each of said branches also including a balanced resistance element; means for generating a unidirectional regularly increasing potential, means for applying said unidirectional potential across said bridge in a sense so as to back bias the resistance element under test, detector means for generating a hold signal when said bridge circuit is in a balanced condition, means responsive to said hold signal for locking said potential generating means against further change, and means for indicating the final potential applied across said bridge circuit.

2. A circuit for determining the reverse dynamic characteristic of a diode rectifier element comprising in combination a bridge circuit having two branches, one of said branches including a reference resistance element, means in the other branch of said bridge adapted to receive a diode to be tested, each of said branches also including a balanced resistance element, means for applying an oscillating unidirectional potential the peak amplitude of which increases with time across said bridge, said potential being applied so as to back bias said diode, detector means for generating a hold signal when said bridge circuit is in a balanced condition, means responsive to said hold signal for maintaining the peak amplitude of said unidirectional signal at its existing level, and means for measuring said peak amplitude.

3. A circuit for determining the reverse potential which will cause the resistance of a diode to fall to a predetermined value comprising in combination a bridge circuit one leg of which is the diode under test, an adjacent leg of which is a reference resistor, and the remaining two legs of which are balanced resistances; means for generating a half sine wave potential of uniformly increasing amplitude, said potential being applied in parallel across said reference resistor and said diode and in a manner so as to back bias said diode, detector means for generating a hold signal when said bridge circuit is in a balanced condition, means responsive to said hold signal for maintaining the amplitude of said half-sine wave signal at its existing level, and means for measuring the peak amplitude of said half sine wave signal.

4. In a device for testing nonlinear resistance elements, circuit comparison means comprising two branches, one of said branches including means for connecting in series therewith a nonlinear resistance element to be tested, the other one of said branches including a standard resistance element with which the nonlinear element is to be compared;

means for generating a unidirectional regularly increasing potential;

means for connecting said potential generating means to said comparison circuit means so as to cause a current to flow through the branches thereof;
current measuring means connected to said branches, said means being responsive to the current level in each of said branches and being capable of generating an electrical output signal when each of said branches have equal current flowing therein; and
means for providing an indication of the voltage across said comparison circuit when said branch currents are equal, said indicating means including a voltmeter connected in parallel with said comparison circuit means, said indicating means further having an input comprising the electrical output signals of said current measuring means whereby in response to said input said voltmeter produces an output indicative of the potential being applied to said comparison circuit when said branches have equal current flowing therein.

References Cited in the file of this patent

UNITED STATES PATENTS

| | | |
|---|---|---|
| 2,743,420 | Haldeman | Apr. 24, 1956 |
| 2,837,714 | Hill | June 3, 1958 |